(12) United States Patent
Almog et al.

(10) Patent No.: US 9,197,586 B2
(45) Date of Patent: Nov. 24, 2015

(54) MAINTAINING CONSISTENT QUALITY OF SERVICE BETWEEN SUBNETS

(71) Applicant: MELLANOX TECHNOLOGIES LTD., Yokneam (IL)

(72) Inventors: Ariel Almog, Kochav Yair (IL); Gil Bloch, Zichron Yaakov (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 109 days.

(21) Appl. No.: 13/754,912

(22) Filed: Jan. 31, 2013

(65) Prior Publication Data

US 2014/0169170 A1    Jun. 19, 2014

Related U.S. Application Data

(63) Continuation-in-part of application No. 13/717,733, filed on Dec. 18, 2012.

(51) Int. Cl.
*H04L 12/851*    (2013.01)
*H04L 12/931*    (2013.01)
*H04L 12/823*    (2013.01)
*H04L 12/725*    (2013.01)

(52) U.S. Cl.
CPC .............. *H04L 49/604* (2013.01); *H04L 47/32* (2013.01); *H04L 45/302* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 5,999,536 A * | 12/1999 | Kawafuji et al. | 370/401 |
| 6,169,741 B1 | 1/2001 | LeMaire et al. | |
| 6,831,918 B1 | 12/2004 | Kavak | |
| 7,009,968 B2 | 3/2006 | Ambe et al. | |
| 7,499,456 B2 | 3/2009 | De Silva et al. | |
| 7,650,424 B2 | 1/2010 | Armitage | |
| 7,715,328 B2 | 5/2010 | Ambe et al. | |
| 8,175,094 B2 | 5/2012 | Bauchot et al. | |
| 8,243,745 B2 | 8/2012 | Endo et al. | |
| 2002/0039357 A1 | 4/2002 | Lipasti et al. | |
| 2004/0213220 A1 | 10/2004 | Davis | |
| 2005/0144313 A1 | 6/2005 | Arndt et al. | |
| 2005/0266842 A1 | 12/2005 | Nasielski et al. | |
| 2008/0253299 A1 * | 10/2008 | Damm et al. | 370/252 |
| 2009/0034540 A1 | 2/2009 | Law | |
| 2011/0261687 A1 | 10/2011 | Armstrong et al. | |

(Continued)

OTHER PUBLICATIONS

Almog et al., U.S. Appl. No. 13/717,733, filed Dec. 18, 2012.

(Continued)

*Primary Examiner* — Hassan Phillips
*Assistant Examiner* — Ayanah George
(74) *Attorney, Agent, or Firm* — D. Kligler I.P. Services Ltd.

(57) ABSTRACT

Network apparatus includes a plurality of interfaces, which are coupled to a network so as to receive and transmit data packets having respective link-layer headers and network-layer headers. Each link-layer header includes respective source and destination link-layer addresses and a link-layer priority value. Switching and routing logic is configured, responsively to the network-layer headers, to transfer each data packet from a respective ingress interface to a respective egress interface and to modify the source and destination link-layer addresses of the transferred data packet while copying the link-layer priority value from the ingress interface to the egress interface without modification.

16 Claims, 1 Drawing Sheet

(56) References Cited

U.S. PATENT DOCUMENTS

| | | |
|---|---|---|
| 2012/0051362 A1 | 3/2012 | Rabie et al. |
| 2012/0063466 A1* | 3/2012 | Sultan et al. ............ 370/401 |
| 2012/0093023 A1 | 4/2012 | Ficet et al. |
| 2013/0301646 A1 | 11/2013 | Bogdanski et al. |

OTHER PUBLICATIONS

Ayoub et al., U.S. Appl. No. 13/731,030, filed Dec. 30, 2012.

Nichols et al., "Definition of the differentiated Services Field (DS Field) in the IPv4 and IPv6 Headers", Network Working Group, Internet Engineering Task Force, RFC2474, 19 pages, Dec. 1998.

IEEE 802.1Q, "Media Access Control (MAC) Bridges and Virtual Bridged Local Area Networks", IEEE Standard for Local and metropolitan area networks, chapter 6 (p. 47-96) and chapter 9.6 (pp. 150-151), Aug. 31, 2011.

IEEE 802.1Qbb, "Media Access Control (MAC) Bridges and Virtual Bridged Local Area Networks—Amendment 17: Priority-based Flow Control", IEEE Standard for Local and metropolitan area networks, 40 pages, Sep. 30, 2011.

Cisco Systems, "Priority Flow Control: Build Reliable Layer 2 Infrastructure", 8 pages, Jun. 2009.

Infiniband Trade Association, "Architecture Specification", vol. 1, Release 1.2.1., Nov. 2007.

Annex 31B of IEEE802.3x, "MAC Control PAUSE operation", pp. 741-751, year 2008.

Vershkov et al., U.S. Appl. No. 13/721,052, filed Dec. 20, 2012.

U.S. Appl. No. 13/721,052 Office Action dated Feb. 26, 2015.

\* cited by examiner

MAINTAINING CONSISTENT QUALITY OF SERVICE BETWEEN SUBNETS

CROSS-REFERENCE TO RELATED APPLICATION

This application is a continuation-in-part of U.S. patent application Ser. No. 13/717,733, filed Dec. 18, 2012, whose disclosure is incorporated herein by reference.

FIELD OF THE INVENTION

The present invention relates generally to computer networks, and particularly to methods and apparatus for routing of data packets in a network.

BACKGROUND

Ethernet™ is a data link-layer protocol (Layer 2 in the Open Systems Interface [OSI] model), which is defined by IEEE standard 802.3. In Ethernet networks, the key functions of the data link layer (which is referred to hereinafter for brevity simply as the "link layer") are performed by the medium access control (MAC) sublayer, and the terms "link layer" and "MAC layer" are generally used interchangeably.

Ethernet Layer-2 networks are commonly integrated as subnets of network-layer (Layer 3) Internet Protocol (IP) networks. A subnet (short for subnetwork) is a logical subdivision of a Layer-3 network. Network ports of nodes within a given subnet share the same Layer-3 network address prefix. For example, in IP networks, the ports in each subnet share the same most-significant bit-group in their IP address. Typically, the logical subdivision of a Layer-3 network into subnets reflects the underlying physical division of the network into Layer-2 local area networks. The subnets are connected to one another by routers, which forward packets on the basis of their Layer-3 (IP) destination addresses, while within a given subnet packets are forwarded among ports by Layer-2 switches or bridges. These Layer-2 devices operate in accordance with the applicable Layer-2 protocol and forward packets within the subnet according to the Layer-2 destination address, such as the Ethernet MAC address.

Both Ethernet and IP standards define packet header fields that can be used to specify different quality of service (QoS) levels, in the form of different priority values that are assigned to different packets. For example, the IP header includes a service type field. According to the original DARPA Internet Protocol specification, published by the Internet Engineer Task Force (IETF) as Request for Comments (RFC) 791, the service type field may contain three bits specifying the type of service (TOS) of the packet. As a more recent alternative, IETF RFC 2474 provides a six-bit differentiated services code point (DSCP) in the IP header. For Ethernet, the IEEE 802.1p standard specifies a three-bit priority code point (PCP) field in the virtual local area network (VLAN) tag of Ethernet frames (as defined by the IEEE 802.1Q standard). The PCP field of the VLAN tag can thus be used to specify eight different QoS levels (or equivalently, classes of service).

SUMMARY

Embodiments of the present invention provide apparatus and methods for maintaining consistent QoS across different subnets of a network.

There is therefore provided, in accordance with an embodiment of the present invention, network apparatus, including a plurality of interfaces, which are configured to be coupled to a network so as to receive and transmit data packets having respective link-layer headers and network-layer headers. Each link-layer header includes respective source and destination link-layer addresses and a link-layer priority value. Switching and routing logic is configured, responsively to the network-layer headers, to transfer each data packet from a respective ingress interface to a respective egress interface and to modify the source and destination link-layer addresses of the transferred data packet while copying the link-layer priority value from the ingress interface to the egress interface without modification.

In the disclosed embodiments, the network-layer headers include a network-layer priority value, and the link-layer priority value is copied from the ingress interface to the egress interface without regard to the network-layer priority value. The switching and routing logic may be configurable between a first configuration in which the link-layer priority value is copied from the ingress interface to the egress interface without regard to the network-layer priority value, and a second configuration in which the link-layer priority value at the egress interface is set to a new value, different from the link-layer priority value at the ingress interface, responsively to the network-layer priority value. In one embodiment, the switching and routing logic can be configured so that the first configuration is applied to a first group of the data packets that are transmitted by the apparatus while the second configuration is applied to a second group of the data packets, disjoint from the first group, that are transmitted by the apparatus.

In some embodiments, the link-layer priority value is entered in a priority code point (PCP) field of a virtual local area network (VLAN) tag of the link-layer headers. The link-layer priority value may identify a link-layer traffic class of the data packets, selected from a group of traffic classes including at least a first class, which is transmitted among nodes in the network without loss of packets, and a second class, in which at least some of the packets are dropped in case of network congestion.

There is also provided, in accordance with an embodiment of the present invention, a method for communication, which includes coupling a plurality of interfaces of a router to a network so as to receive and transmit data packets having respective link-layer headers and network-layer headers. Each data packet is transferred, responsively to the network-layer headers, from a respective ingress interface to a respective egress interface of the router. The source and destination link-layer addresses of the transferred data packet are modified while copying the link-layer priority value from the ingress interface to the egress interface without modification.

The present invention will be more fully understood from the following detailed description of the embodiments thereof, taken together with the drawings in which:

DETAILED DESCRIPTION OF EMBODIMENTS

Figure 1:
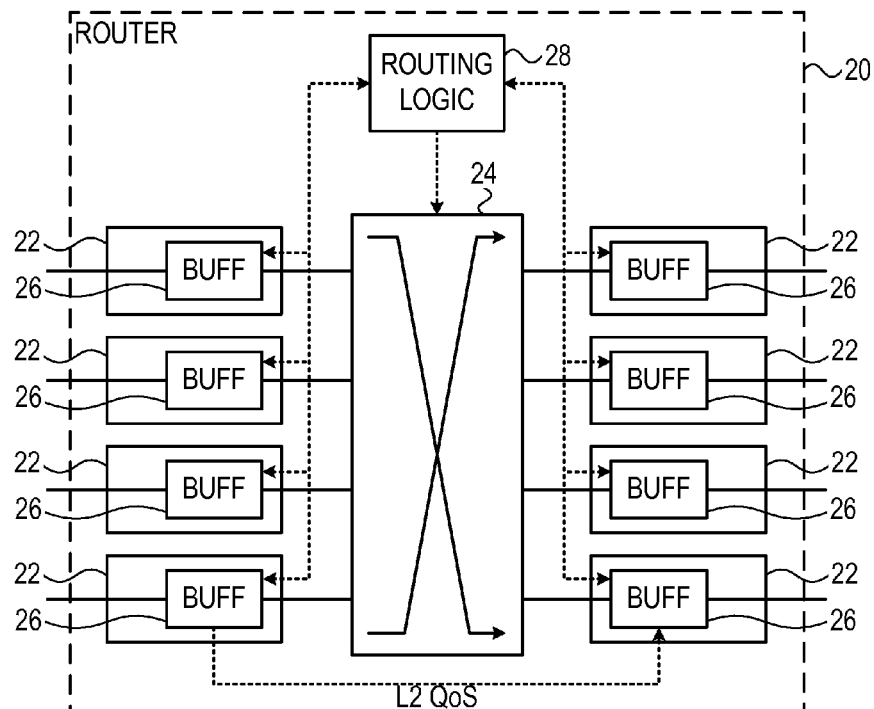
FIG. 1 is a block diagram that schematically shows elements of a router, in accordance with an embodiment of the present invention.

A router, as is known in the art, is a device, that receives and transmits data packets through multiple interfaces, which are typically coupled by underlying ports to respective links in different subnets. For the sake of conceptual clarity, the element of a router that connects to the network is referred to in the present description and in the claims as an "interface," as distinguished from a link-layer "port." References to operations involving "interfaces" should be understood, however, as including Layer-2 operations carried out on the underlying ports.

Packets entering the router have respective link-layer headers and network-layer headers, wherein each link-layer header comprises respective source and destination link-layer addresses and may also comprise a link-layer priority value. The description that follows will relate specifically to Ethernet packets, transmitted over subnets of an IP network, so that the link-layer header is an Ethernet MAC header, including a PCP priority value as described above. The principles of the present invention, however, may similarly be applied, mutatis mutandis, in other types of networks having similar facilities and properties.

Switching and routing logic in the router reads the IP (network-layer) headers of incoming packets and transfers each data packet to the appropriate egress interface based on the IP header. (Routing decisions may also depend on other considerations, but they are beyond the scope of this patent application.) The router typically discards the MAC header of the packet received at the ingress interface. Before the packet is transmitted from the egress interface, the switching logic generates a new MAC header, with modified source and destination MAC addresses. In the switching logic of routers that are known in the art, the switching logic also sets the PCP priority value in the MAC header, typically by mapping the network-layer QoS indicator, such as the DSCP value, from the IP header to a corresponding PCP value. Alternatively, in some routers, the PCP values of outgoing packets are fixed at a single, predefined value for each port or over the entire router.

In some network applications, it is desirable, or even necessary, that PCP values be preserved from subnet to subnet. For example, the PCP values may be used to implement network-wide priority flow control (PFC), in order to define lossless and lossy Ethernet traffic classes, as explained in the above-mentioned U.S. patent application Ser. No. 13/717,733. As explained above, however, conventional IP routers discard the PCP values (along with other MAC header information) of incoming packets. Therefore, to maintain consistent PCP values over multiple subnets in this sort of application, using conventional IP routers, all of the switching logic must be programmed to maintain the same mapping between DSCP and PCP values, and participating host computers must likewise be programmed to insert the correct DSCP values in packets that they transmit. The mapping of DSCP to PCP values is not straightforward, since the DSCP field contains six bits, while the PCP field contains only three.

In embodiments of the present invention, routers overcome the difficulty of maintaining consistent PCP (link-layer) priority values throughout the network by saving the PCP values of packets at their respective ingress interfaces, and copying these values without modification to the corresponding packets transmitted via the respective egress interfaces. In other words, although the router discards the MAC header, and the switching logic at the egress interface rebuilds the MAC header essentially from scratch, the PCP value is copied through the router without change. As a result, no DSCP/PCP mapping is required by the switching logic, and host processors may set the DSCP field to any desired value (or not set it at all), since the PCP value will be copied from the ingress interface to the egress interface of the router without regard to the DSCP value.

FIG. 1 is a block diagram that schematically shows elements of a router 20, in accordance with an embodiment of the present invention. The drawing and the description that follows are simplified, for the sake of clarity and conciseness, to focus only on the elements of router 20 that are essential to an understanding of the present embodiment. Other, conventional components and functions of the router will be apparent to those of ordinary skill in the art. Aspects of the operation of router 20 are described hereinbelow with reference to and using terminology of the IP and Ethernet protocols, but as noted earlier, the principles of in the present embodiment may similarly be applied in other types of networks, under other protocols having similar properties.

Router 20 comprises multiple interfaces 22, which are coupled to corresponding network links and are interconnected by a switching core 24 of the router. Typically, each interface has a respective buffer 26, which serves as an input buffer to hold incoming packets waiting for processing and/or transfer to the appropriate output interfaces by core 24. Buffers 26 may also serve as output buffers, holding packets awaiting egress. Although buffers 26 are shown in FIG. 1 as separate logical entities within respective interfaces 22, in some implementations physical buffer space may be shared among multiple interfaces (or all interfaces), as is known in the art.

Switching and routing logic 28 (referred to as "routing logic" for brevity) reads the IP headers of incoming packets and decides on the egress interface or interfaces through which each packet should be transmitted. Typically, the routing logic chooses the egress interfaces by looking up the IP destination addresses of the incoming packets, possibly along with other header information, in routing tables (not shown) maintained by the routing logic, as is known in the art. In transferring a packet from ingress interface to egress interface, routing logic 28 typically discards the Ethernet MAC source and destination addresses, as noted earlier, and generates a modified MAC header in the packet that is to be transmitted from the egress interface. At the same time, the routing logic may copy the Layer-2 QoS field (i.e., the PCP value in the Ethernet MAC header) from the ingress interface to the egress interface without change.

Figure 2:
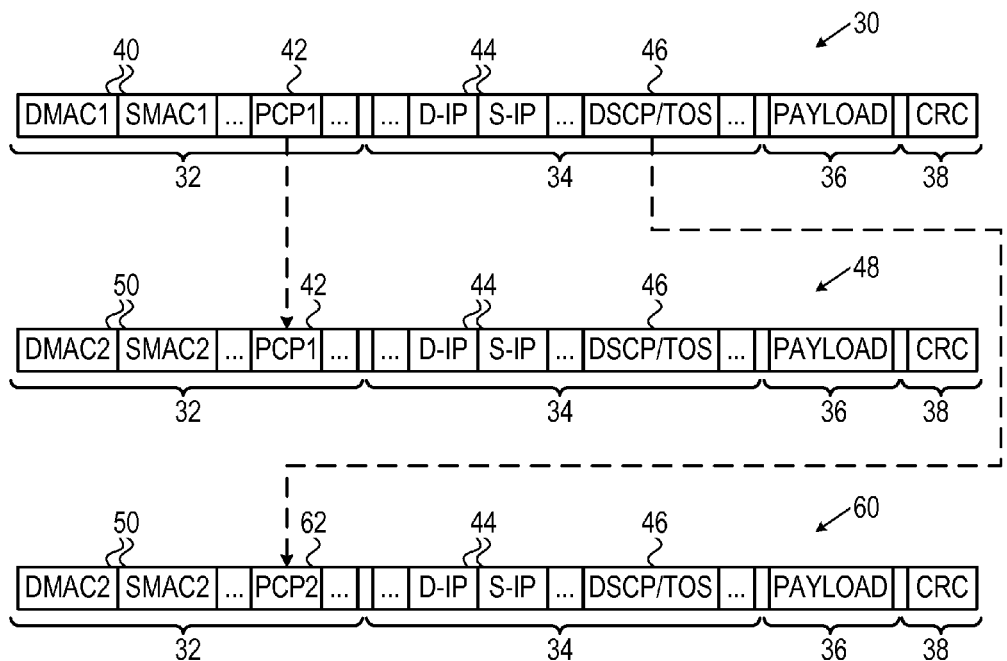
FIG. 2 is a block diagram that schematically illustrates data packets received and transmitted by a router, in accordance with an embodiment of the present invention.

FIG. 2 is a block diagram that schematically illustrates an incoming data packet 30 received by router and a corresponding outgoing data packets 48 and 60 transmitted by the router, in accordance with an embodiment of the present invention. Packet 30 comprises an Ethernet MAC header 32, followed by an IP header 34, a payload 36, and an error-checking code 38, such as a cyclic redundancy code (CRC). Ethernet header 32 begins with the conventional destination and source MAC address fields 40 (DMAC1 and SMAC1 in FIG. 2), followed by other fields including a VLAN tag, which contains a three-bit PCP field 42 (labeled PCP1), as defined above. IP header 34 contains IP source and destination address fields 44, as well as various other fields including a service type field 46, typically containing a TOS or DSCP priority value.

In transferring packets between interfaces 22, routing logic 28 typically modifies Ethernet header 32 in outgoing data packet 48, relative to incoming data packet 30, by replacing the original destination and source MAC addresses with new addresses 50 (DMAC2 and SMAC2). Logic 28, however, may be configured to copy the value of PCP field 42 in received packet 30 through to the new Ethernet header 32 in outgoing packet 48 without change, regardless of the network-layer priority value given by IP service type field 46.

As noted earlier, the value of PCP field 42 may be used in assigning the packet to an appropriate Ethernet traffic class. Thus, for example, one PCP value may indicate that the packet belongs to a lossless class that is transmitted among nodes in the network without loss of packets, while other PCP values indicate potentially lossy classes, in which at least some of the packets are dropped in case of network congestion.

The PCP pass-through functionality described above may not be desired in all cases, i.e., for some applications the network operator may prefer to have routing logic 28 set the PCP value of outgoing packets in the conventional manner, either according to the value of IP service type field 46 or to some fixed PCP value. Therefore, in some embodiments, router 20 is configurable between a "PCP pass-through" configuration, as described above, and a "PCP reset" configuration, in which the PCP value at the egress interface is set to a new value, which is different from the PCP value at the ingress interface. Typically, the egress PCP value in this latter configuration depends on the network-layer priority value, i.e., on IP service type field 46. Alternatively or additionally, other criteria may be applied in setting the new PCP value. This option is illustrated in FIG. 2 by outgoing packet 60, in which logic 28 has written a new PCP value 62 (labeled PCP2) to header 32 by mapping of service type field 46 in IP header 34 of incoming packet 30 to the corresponding PCP value.

The PCP-handling configuration of the router may be set uniformly (to either "pass-through" or "reset") for all packets and interfaces or, alternatively, different configurations may be applied to different, disjoint groups of packets. For example, some interfaces (or groups of interfaces) of router 20 may be set for PCP pass-through, while packets traversing other interfaces will have their PCP values changed according to the IP service type. Furthermore, when router 20 supports network virtualization, the PCP configuration may be set and implemented respectively for each interface of each overlay network that traverses the router. Facilities for this sort of network virtualization in IP and Ethernet networks are described, for example, in U.S. patent application Ser. No. 13/731,030, filed Dec. 30, 2012, whose disclosure is incorporated herein by reference. In this sort of virtualization environment, routing logic 28 may be set to apply different PCP-handling configurations to different packets, depending on packet header fields that define the network and/or interface through which each packet is to be forwarded.

The PCP-handling configuration may be set, along with other features of router 20, using any suitable programming technique for routers and other switches that is known in the art. For example, logic 28 may have an application program interface (API) that allows a system operator to set the PCP-handling configuration for each interface (physical or virtual) of the router.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Network apparatus, comprising:
a plurality of interfaces, which are configured to be coupled to a network so as to receive and transmit data packets having respective link-layer headers and network-layer headers, each link-layer header comprising respective source and destination link-layer addresses and a link-layer priority value field; and switching and routing logic, which is configured, responsively to the network-layer headers, to transfer each data packet from a respective ingress interface to a respective egress interface and to modify the source and destination link-layer addresses of the transferred data packets while, for a first group of packets including at least a sub-group of the packets received through the plurality of interfaces, copying the link-layer priority value in the link-layer priority value field of the packet link layer header from the ingress interface to the link-layer priority value field of the packet link layer header in the egress interface without modification, wherein the link-layer priority value field of the packet link layer header is used by units handling the data packet in implementing priority flow control.

2. The apparatus according to claim 1, wherein the network-layer headers include a network-layer priority value, and wherein for the first group of data packets the link-layer priority value is copied from the ingress interface to the egress interface without regard to the network-layer priority value.

3. The apparatus according to claim 2, wherein the switching and routing logic is configurable between a first configuration in which the link-layer priority value of packets of the first group is copied from the ingress interface to the egress interface without regard to the network-layer priority value, and a second configuration in which the link-layer priority value at the egress interface of packets of the first group is set to a new value, irrespective of the link-layer priority value at the ingress interface, responsively to the network-layer priority value.

4. The apparatus according to claim 1, wherein the switching and routing logic is configured to copy the link-layer priority value from the ingress interface to the egress interface for packets of the first group of the data packets that are transmitted by the apparatus while for a second group of the data packets, disjoint from the first group, that are transmitted by the apparatus, the link-layer priority value at the egress interface is set to a new value irrespective of the link-layer priority value at the ingress interface.

5. The apparatus according to claim 1, wherein the link-layer priority value is entered in a priority code point (PCP) field of a virtual local area network (VLAN) tag of the link-layer headers.

6. The apparatus according to claim 1, wherein the link-layer priority value identifies a link-layer traffic class of the data packets, selected from a group of traffic classes comprising at least a first class, which is transmitted among nodes in the network without loss of packets, and a second class, in which at least some of the packets are dropped in case of network congestion.

7. A method for communication, comprising:
coupling a plurality of interfaces of a router to a network so as to receive and transmit data packets having respective link-layer headers and network-layer headers, each link-layer header comprising respective source and destination link-layer addresses and a link-layer priority value field;

transferring each data packet, responsively to the network-layer interface headers, from a respective ingress interface to a respective egress interface of the router; and modifying the source and destination link-layer addresses of a first group of the transferred data packets including at least a sub-group of the packets received through the plurality of interfaces, while copying the link-layer priority value in the link-layer priority value field of the packet link layer header from the ingress interface to the link-layer priority value field of the packet link layer header in the egress interface without modification, wherein the link-layer priority value field of the packet link layer header is used by units handling the data packet in implementing priority flow control.

8. The method according to claim 7, wherein the network-layer headers include a network-layer priority value, and wherein for the first group of data packets the link-layer priority value is copied from the ingress interface to the egress interface without regard to the network-layer priority value.

9. The method according to claim 8, wherein the link-layer priority value of packets of the first group is copied from the ingress interface to the egress interface without regard to the network-layer priority value in a first configuration of the router, and wherein the method comprises applying a second configuration to the router in which the link-layer priority value at the egress interface of packets of the first group is set to a new value, irrespective of the link-layer priority value at the ingress interface, responsively to the network-layer priority value.

10. The method according to claim 7, comprising transferring each data packet of a second group of the data packets, disjoint from the first group, that are transmitted by the router, while setting their link-layer priority value at the egress interface to a new value irrespective of the link-layer priority value at the ingress interface.

11. The method according to claim 7, wherein the link-layer priority value is entered in a priority code point (PCP) field of virtual local area network (VLAN) tag of the link-layer headers.

12. The method according to claim 7, wherein the link-layer priority value identifies a link-layer traffic class of the data packets, selected from a group of traffic classes comprising at least a first class, which is transmitted among nodes in the network without loss of packets, and a second class, in which at least some of the packets are dropped in case of network congestion.

13. The method according to claim 7, wherein transferring each data packet of the first group comprises saving the link-layer priority value and discarding the link-layer header for each data packet of the first group received at the ingress interface.

14. The method according to claim 7, wherein transferring each data packet of the first group comprises creating the link layer header from scratch, except for the link-layer priority value, for packets of the first group, at the egress.

15. The apparatus according to claim 1, wherein the switching and routing logic is configured to save the link-layer priority value and discard the link-layer header for each data packet of the first group received at the ingress interface.

16. The apparatus according to claim 1, wherein the switching and routing logic is configured to create the link layer header from scratch, except for the link-layer priority value, for packets of the first group, at the egress.

* * * * *